United States Patent Office 3,597,164
Patented Aug. 3, 1971

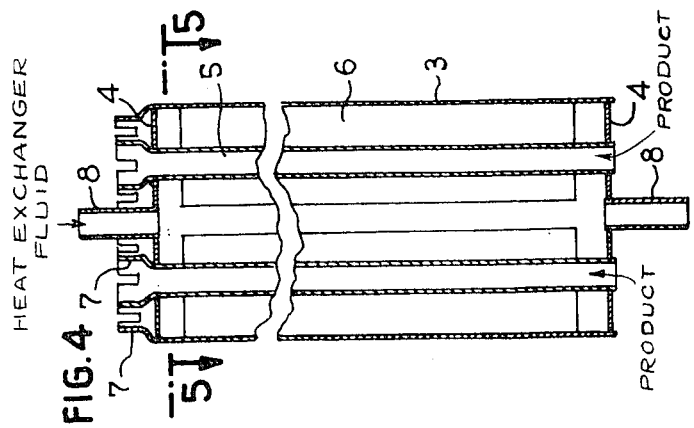
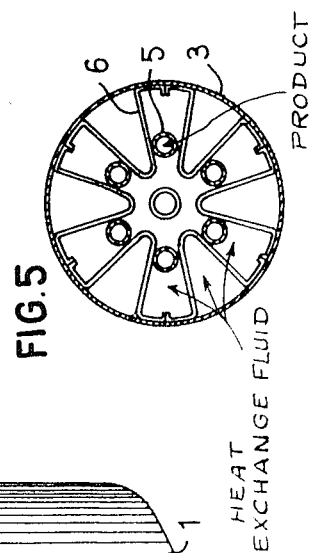
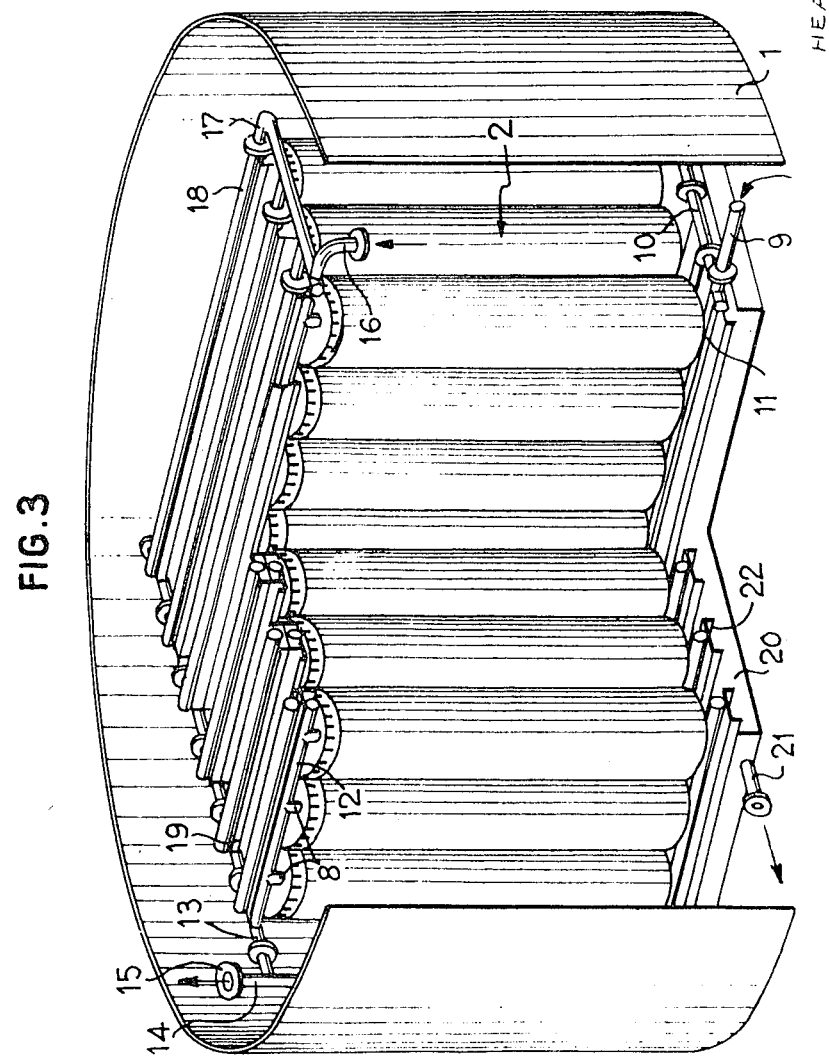

3,597,164
PROCESS AND APPARATUS FOR THE PURIFICATION OF CRYSTALLIZABLE ORGANIC COMPOUNDS
Claude Ab-Der-Halden, Nancy, France, assignor to Proabd S.A., Nancy, France
Filed Sept. 3, 1968, Ser. No. 756,919
Claims priority, application France, Sept. 5, 1967, 119,942; Nov. 29, 1967, 130,114
Int. Cl. B01d 9/04
U.S. Cl. 23—273F
9 Claims

ABSTRACT OF THE DISCLOSURE

A process and method for purifying a crystallizable organic compound in the liquid state in a vessel. The process comprises introducing the compound in at least one vessel, solidifying said compound by cooling and then heating it slowly so as to melt the impurities which drain from the remaining product, the latter being progressively purified and collected when it reaches the desired purity. The feature of the invention is that the cooling and heating of said compound to be purified are carried out by causing a heat exchange fluid to flow on the outer wall of said vessel containing said compound, said vessel having for this purpose a large heat transfer surface.

---

The present invention relates to the purification of crystallizable organic compounds.

Processes and apparatuses for purifying crystallizable organic substances such as naphthalene, benzene and a large number of other substances, are known. For example, a naphthalene refining process and apparatus have been described in the French Pat. No. 1,203,862.

This purifying process comprises slowly cooling the liquid substance to be purified so as to crystallize the whole of the latter, slowly heating the crystallized mass and eliminating the liquid fraction which is the first to flow and has a high content of impurities, and then melting the residual crystals so as to collect the purified substances in the liquid state.

The liquid fraction having a high content of impurities can be in turn cooled and crystallized in the same way and then heated so as to separate once more a fraction having a higher concentration of impurities and the residual substance recovered and re-cycled for the treatment of the raw substance to be purified.

Thus, in one or a plurality of cascade operations, the crystallizable substance is purified and all the impurities are concentrated in a small volume.

The apparatus for carrying out this process comprises a vessel divided into two superimposed parts by a filtering device located in the vicinity of the bottom of the vessel, the upper part of the vessel containing tubular elements for the circulation of a heat exchange fluid and having therebetween free spaces for the path of the raw naphthalene, the vessel having an aperture in the upper part for the introduction of the naphthalene and an aperture at the base of the lower part for discharging the various constituents thereof.

Although very good results are obtained, this process and the apparatus for carrying it out have a certain number of drawbacks.

The cooling and heating of the substance to be purified are affected by the exterior temperature conditions.

If the substance to be purified is corrosive, not only the vessel but also the heat exchange fluid circulation elements must be adapted to resist the corrosive action of this substance and this considerably increases the cost of the apparatus.

The flow of the heat exchange fluid is high.

The object of the invention is to overcome these drawbacks and provide a process and apparatus for purifying crystallizable organic compounds whereby it is possible to obtain very pure products at an advantageous cost price.

The process according to the invention comprises introducing a crystallizable organic compound to be purified in the liquid state in at least one vessel, solidifying said compound by cooling and then heating it slowly so as to melt the impurities which drain from the remaining product, the latter being progressively purified and collected when it reaches the desired purity, wherein the cooling and heating of said compound to be purified are carried out by causing a heat exchange fluid to flow, on the outer wall of said vessel containing said compound, said vessel having for this purpose a large heat transfer surface.

According to another feature of the invention, portions of product to be purified are introduced in succession into a plurality of vessels at regular intervals of time and the product contained in each vessel is subjected to a complete purification cycle which is staggered in time relative to the cycle of the vessel filled immediately before it to the extent of one of said intervals, while maintaining by means of said heat exchange fluid the temperature of the product in each vessel at the value appropriate to the part of the cycle said product is in.

Another object of the invention is to provide an apparatus for carrying out said process, said apparatus comprising a treating vessel for the product to be purified and means for admitting said product into said vessel, a device for discharging from the latter and a device for projecting a heat exchange fluid onto the outer wall of the vessel.

Accordingly to another feature of the invention, the treating vessel for the product to be purified consists of at least one transfer element comprising a nest of tubes mounted in a larger tube by means of longitudinal inner plates, said transfer element being connected in the circuit for circulating the product to be purified.

According to a further feature of the invention, the apparatus comprises at least four treating vessels for the product to be purified arranged in parallel relation and respectively connected to a source of raw product to be purified and to collectors of impurities and of purified product through devices for admitting in succession said product into said vessels and discharging in succession the impurities and the purified product from the vessels, and devices for projecting in succession heat exchange fluids on the outer walls of each vessel.

Further features and advantages of the invention will be apparent from the ensuing description with reference to the accompanying drawings.

In the drawings:

FIG. 3 is a perspective view, with a part cut away, of the treating part of the one embodiment of an apparatus according to the invention;

FIG. 4 is a sectional view of a transfer element of the apparatus shown in FIG. 3;

FIG. 5 is a sectional view taken along line 5—5 of FIG. 4;

Figure 1:
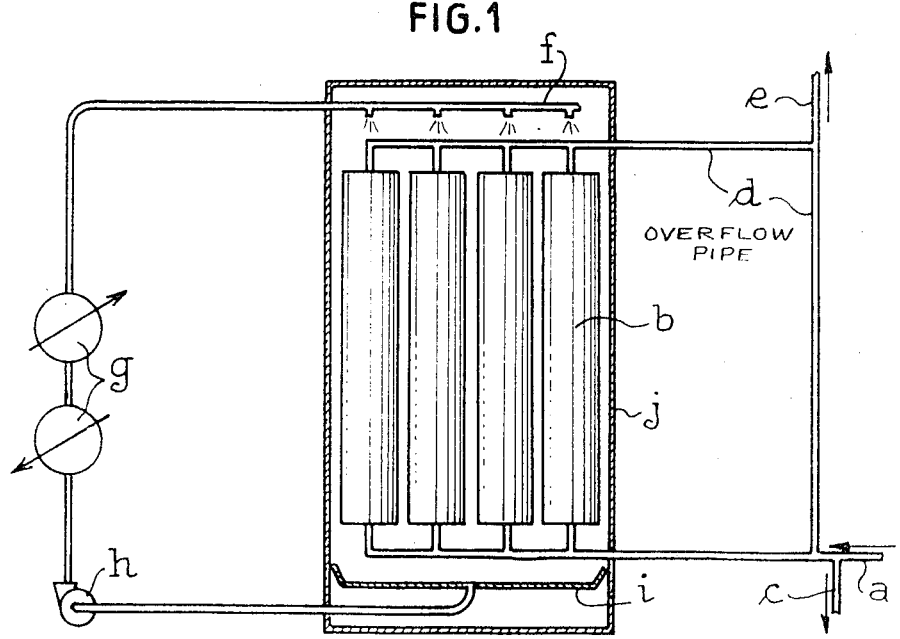
FIG. 1 is a diagram showing how the process is carried out when the heat exchange fluid employed is a liquid.

Reference will be had first to FIG. 1 to explain how the process according to the invention is carried out, the heat exchange fluid being a liquid.

The illustrated apparatus comprises mainly piping $a$ connected to transfer elements $b$ described in detail hereinafter and adapted to receive the compound to be purified. The piping $a$ comprises a pipe $c$ for collecting the various liquid fractions in the course of the purification procedure. The transfer elements $b$ are connected at their upper parts to an overflow pipe $d$ communicating with the piping $a$ and including a vent $e$.

A fluid distributor $f$ located above the transfer elements $b$ is adapted to project or spray a heat exchange liquid onto these elements. The distributor $f$ is connected to exchangers $g$ which communicate through a pump $h$ with a pan $i$ for collecting the streaming liquid. A case $j$ protects the whole of the apparatus.

The process is carried out in the following manner:

The product to be purified is introduced in the liquid state by way of the piping $a$ into the transfer elements $b$ so as to fill the latter.

A cooling liquid is then sprayed by the distributor $f$ onto the transfer elements $b$ and cools the substance to be purified contained in the element $b$ by flowing along the outer walls of the latter. When the substance to be purified is crystallized, the supply of cooling liquid is turned off.

Thereafter, a heating liquid, which may be the same liquid as that employed for cooling, is sprayed onto the transfer elements $b$ by the same distributor $f$. The flowing of the heating fluid along the outer walls of the transfer elements gradually raises the temperature of the product to be purified.

The heat exchange fluid flows along the walls of the transfer elements $b$ in the form of a thin film or layer having a homogenous temperature. The impurities contained in this product, which have a melting point lower than the product, flow under the effect of gravity along the transfer elements and are discharged by way of the pipe $c$.

The concentration of the product contained in the transfer elements is thus greatly increased.

By continuing to cause the heating liquid to flow or run, the purified product is brought to its melting temperature. If the product has reached the desired purity, it is discharged by way of the pipe $c$, but to increase its concentration it can be subjected to a further purification cycle and the operation can be repeated as many times as required.

After having run along the walls of the transfer elements $b$, the heat exchange liquid is collected in the pan $i$ whence it is drawn by the pump $h$ and caused to pass through the exchanger $g$ in which it is heated or cooled, depending on whether its function is to heat or cool.

The process just described enables a large number of crystallizable organic substances to be purified, these substances being for example:

Fatty acids, phenols, hydrocarbons, nitrogenous compounds, di-substituted benzenes, and more particularly naphthalene, benzene, carbazol, anthracene, benzopyrene, diphenyl, phenanthrene, pyrene, chrysene, terphenyl, sexiphenyl, m-cresol, p-cresol, cyclohexane, p-dichlorobenzene, dicyclopentadiene, phenol, phthalic anhydridtriethanolamine, p-xylene, acetamide, acetic acid, aniline, benzoic acid, caprolactame, ethyl alcohol, formic acid, mono-nitrochlorobenzene, paraffin wax, propionic acid, succinic acid, stearic acid, urea.

The heat exchange liquid can be an organic compound, a mixture or organic compounds, pure water, a mixture of water and alcohol, or a glycol.

The chosen liquid must not have a corrosive action on the parts of the transfer elements and the ducting piping must have a vapour pressure much lower than atmospheric pressure and a lower viscosity, of the order of 1 or 2 degrees Engler.

Figure 2:
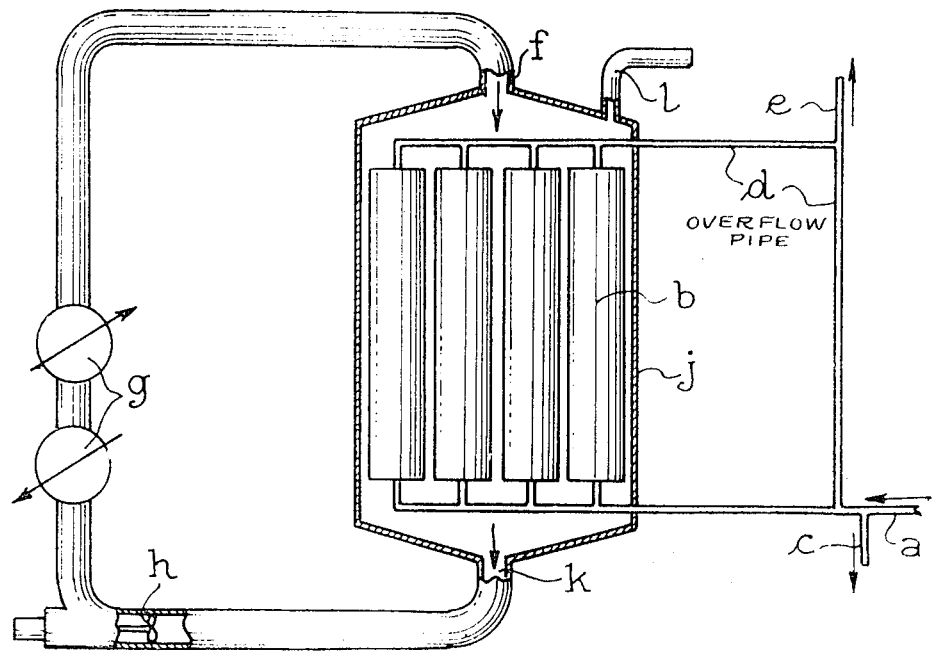
FIG. 2 is a diagram showing how the process is carried out when the heat exchange fluid is a gas.

FIG. 2 shows a modification of the process, the heat exchange fluid being a gas.

According to this modification, the case $j$ is rendered fluidtight and provided with three apertures, a gaseous fluid inlet aperture $f$, a discharge aperture $k$ for this fluid, and an aperture $l$ for communicating with a reservoir of a gas under constant pressure (not shown). The pump $h$ shown in FIG. 1 is replaced by a fan.

The circuit of the product to be purified is identical to that of the foregoing example.

The heat exchange gas is put into motion by a fan $h$ and enters the case $j$ by way of the aperture $f$ and heats or cools the product to be purified by flowing along the walls of the transfer elements $b$ and then passes out of the case by way of the aperture $k$.

Upon contact with the transfer elements, the gas undergoes variations in temperature, and consequently variations in pressure, which are compensated by the constant-pressure gas contained in a reservoir communicating with the case $j$ by way of the aperture $l$.

The heat exchange gas employed can be of any type, provided it does not contain impurities which could result in a frosting phenomenon at the temperature at which the gas is cooled.

The apparatus shown in FIG. 3 mainly comprises a case 1 in which are mounted thirty-six transfer elements 2 in rows of six.

A transfer element shown in FIGS. 4 and 5 comprises an outer tube 3 terminating at both ends in two tubular flanges 4 to which are welded six tubes 5 for receiving a part of the heat exchange fluid; thin longitudinal fins or plates 6 are fixed to the tubes 5 and to the inner wall of the outer tube 3 (FIG. 5).

Rings mounted on the upper flange 4 of the element 2 are adapted to distribute the heat exchange fluid onto the outer wall of said transfer element. A connecting pipe 8 is provided at each end of the element 2.

The thirty-six transfer elements 2 are connected by their lower connecting pipes to piping 9 through a main manifold 10 and secondary manifold 11, the piping 9 communicating with a reservoir containing the product to be purified (not shown).

The upper connecting pipes of the transfer elements 2 communicate by way of manifolds 12 and 13 with an overflow pipe 14 provided with a vent 15.

The heat exchange liquid inlet circuit consists of a pipe 16 connected to a manifold 17, pipes 18 and distributors 19 located above the transfer elements 2 and provided with slits for the purpose of spraying said elements.

A pan 20 located at the base of the apparatus for receiving the running liquid has a suction aperture 21 connected to a pump (not shown).

The transfer elements 2 are supported by girders 22 of a structure inside the case 1. The latter seals the apparatus. The apparatus operates in the same manner as that of the apparatus shown in FIG. 1.

In the process and apparatus just described with reference to FIGS. 1-5, the product to be purified passes through the following operational stages in succession:

Filling of the treating vessel, crystallization, slow heating and discharge of the impurities, melting of the purified product and draining.

Assuming for example that the various stages of this cycle require the following times:

2 hours for the filling,
6 hours for the crystallization,
8 hours for the purification,
2 hours for the melting, the complete cycle lasts 18 hours. To treat a certain amount of product, an apparatus of the equivalent capacity, which would be useless for another operation until the end of this cycle, must be used.

The discontinuous treatment of large amounts of product therefore requires space-consuming apparatuses.

Now, it has been discovered that, instead of subjecting a large amount of product in one go to the aforementioned successive operations, it is possible to divide this amount into equal parts and subject these parts to said operations successively, taking into account the time required for each one thereof.

Figure 6:
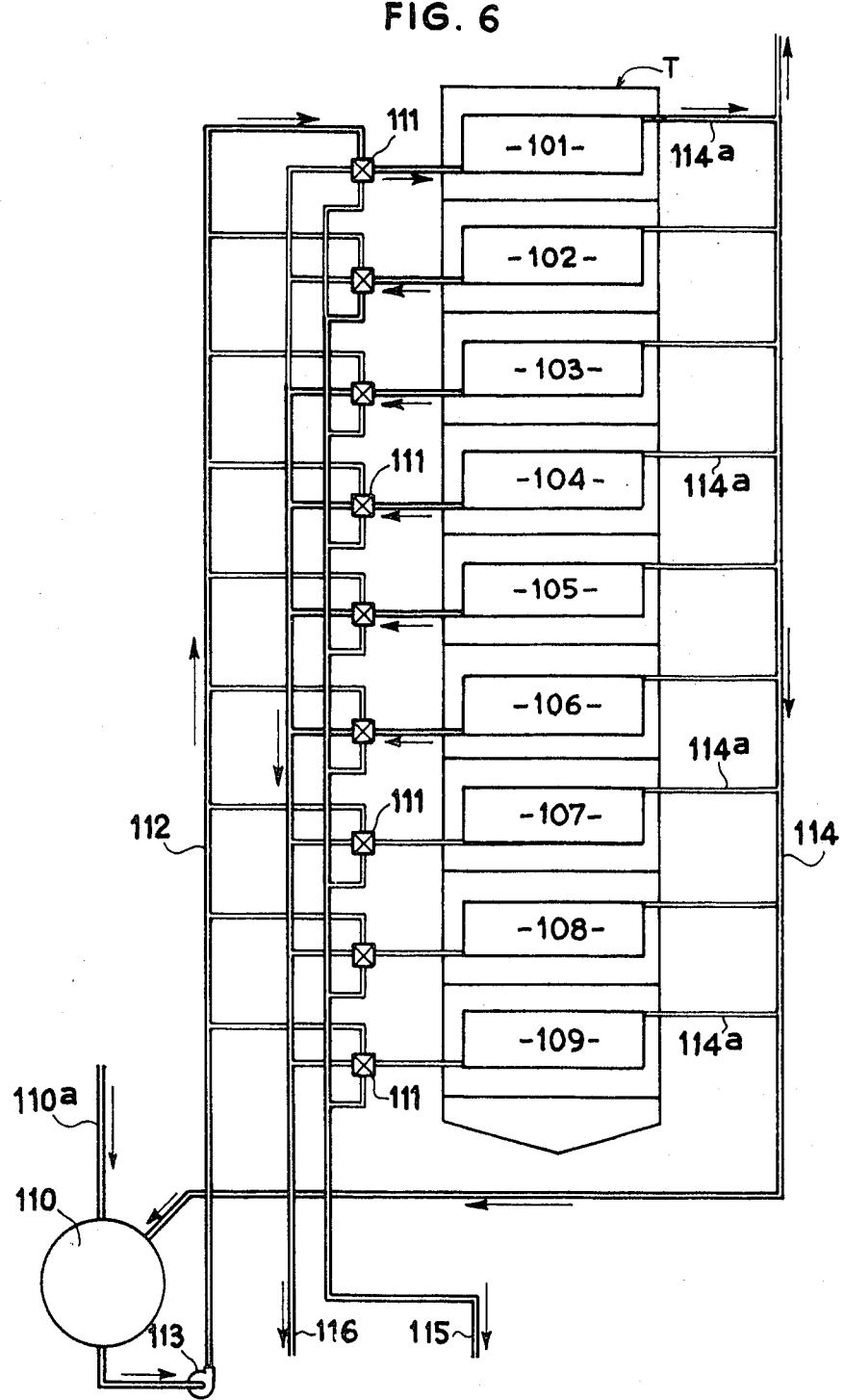
FIG. 6 is a diagrammatic view of another embodiment of the apparatus according to the invention and in particular the device for circulating the product to be purified.

The apparatus shown in FIG. 6 comprises, mounted in a tower T, nine vessels 101 to 109. Each of the vessels could have, for example, a capacity of 10 tons (French), and is disposed in a separate compartment. The vessels can be put in communication with a reservoir 110 containing the raw product, a pure product collector 115 or an impurities collector 116 through three-way valves 111 and suitable conduits, depending on the part of the purification cycle they are in.

In FIG. 6, the vessel 101 is shown in the filling stage. It is therefore connected to the product reservoir 110 (which is itself filled by way of a conduit 110a) by way of a pipe 112 including a pump 113 and by way of the valve 111 which has the corresponding open position.

The product contained in the vessel 102 is in the melting stage of the cycle. This vessel is connected to the pure product collector 115 by way of its valve 111 in the corresponding open position.

The product contained in the vessels 103, 104, 105, 106 is in the heating stage. These vessels are connected to the impurities collector 116 by way of their respective valves 111 in the appropriate open position.

The product contained in the vessels 107, 108, 109 is in the solidification or crystallization stage. The valves 111 of these vessels are closed.

An overflow pipe 114, connected to each vessel by a conduit 114a, returns the excess raw product to the reservoir 110.

Figure 7:
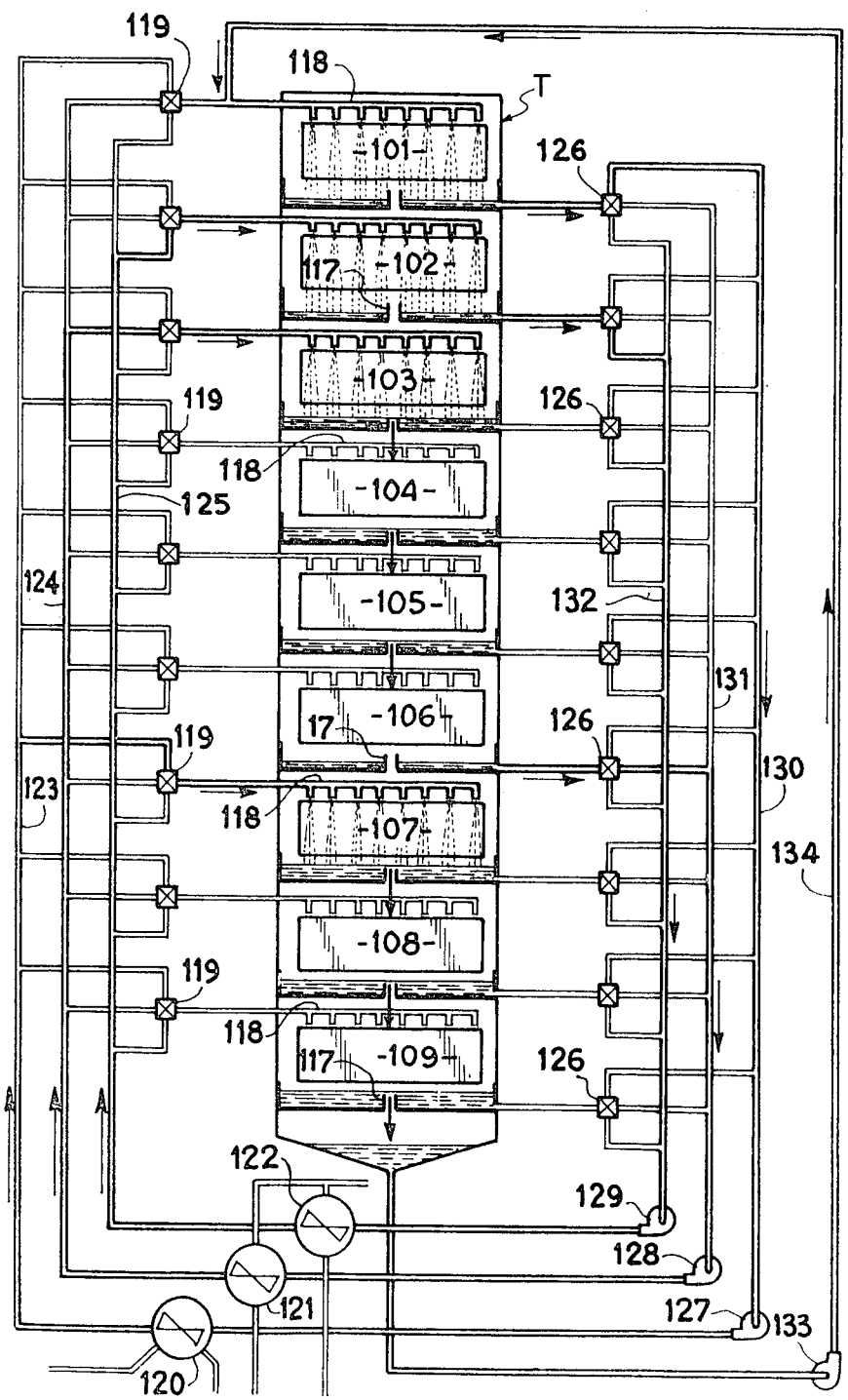
FIG. 7 is a diagrammatic view of the device for circulating the heat exchange fluid of the apparatus shown in FIG. 6.

The device for circulating the heat exchange fluid of the apparatus is shown in FIG. 7.

This FIG. 7 shows the nine vessels 101 to 109 disposed in the tower T in their superimposed compartments which intercommunicate by way of overflow apertures 117. Each vessel is provided with a distributor 118 of heat exchange fluid and a three-way valve 119, the ways of which are respectively connected to the three heat exchangers 120, 121, 122 by way of pipes 123, 124, 125 and a fluid discharge pipe with a three-way valve 126, the ways of which are respectively connected to three pumps 127, 128, 129 by way of pipes 130, 131, 132. The exchanger 120, the pump 127 and the pipes 123 and 130 form an independent circuit, in the same way as the exchanger 121, the pump 128 and the pipes 124 and 131 and the exchanger 122, the pump 129 and the pipes 125 and 132.

The exchanger 120 is a cooler and adapted to feed the vessels, through the pump 127, with fluid in which the product is in the crystallization or solidification stage. The exchanger 121 is a heater and adapted to feed the vessels, through the pump 128, with fluid in which the product is in the heating stage. The exchanger 122 is also a heater and adapted to feed the vessels, through the pump 129, with fluid in which the product is in the melting stage. A fourth circuit, comprising a pump 133 and a pipe 134, is adapted to draw off the heat exchange fluid from the base of the compartment of the lower vessel 109 and return it to the fluid distributor of the upper vessel 101.

The illustrated apparatus operates in the following manner:

For the description of this operation, a complete purification cycle of 18 hours will be considered, which is for example divided as follows: filling of the vessel: 2 hours; solidification or crystallization: 6 hours; heating: 8 hours; melting and discharge of the purified product: 2 hours.

The heat exchange fluid, cooled by the exchanger 120, is sent into the fluid distributor 118 of the vessel 107, in which the product is at the end of the crystallization stage of the cycle, by way of the pipe 123 and the corresponding inlet valve 119. This fluid flows, by way of the aperture of the overflow pipe 117 into the comparement of the vessel 108, and then onto the vessel 109 by way of the aperture of the overflow pipe of the compartment of the vessel 108. The pump 133 draws the fluid from the base of the tower T and returns it to the fluid distributor 118 of the vessel 101, which is in the product filling stage, so as to subject the product to a first cooling.

Then the cooling fluid returns, by way of the valve 126 and the pipe 130, to the pump 127 and is cooled in the exchanger 120 and thereafter recycled to the vessel 107.

The vessel 102, in which the product is in the course of melting, is sprayed by a heat exchanbe fluid which is heated to the desired temperature by the heater 122 and sent to the distributor by way of the pipe 125 and the corresponding valve 119. This fluid returns to the pump 129 by way of the corresponding valve 126 and the pipe 132.

Finally, the heat exchange fluid for purifying the product (heating stage), heated to the desired temperature by the heater 121, feeds the fluid distributor 119 of the vessel 103 which is at the end of the purification stage. The fluid flows in succession from the compartment of the vessel 103 to those of the vessels 104, 105, 106 by way of the overflow apertures 118 of the compartments 103, 104, 105 then returns to the pump 128 by way of the valve 126 of the vessel 106 and the pipe 131.

The apparatus operates in this way for 2 hours. Then the product circulating valves 111 (FIG. 1) are put in another position.

The vessel 102, which was emptied during the melting stage, passes to the filling stage.

The vessel 103, in which the purification has finished, passes to the melting stage. The vessels 104, 105, 106 are maintained in the heating position.

The vessel 107, in which the crystallization is finished, passes to the heating stage, the vessels 108 and 109 remaining in the crystallization stage, their valves 111 remaining closed.

The vessel 101, which has just been filled, passes to the crystallization stage, its valve 111 be shifted to the closed position. Simultaneously, the position of the valves for feeding and discharging heat exchange fluid 119 and 126 are set in such manner that a fluid of suitable temperature is sent to the distributors of the vessels in their new stage in the cycle. In order to ensure that the vessel 102 is bathed by the cooling fluid during its filling, the corresponding fluid feed valve 119 is closed and the corresponding discharge valve 126 is open to the pipe 130.

The vessel 101, having passed through the crystallization stage, receives the cooling fluid sent by the pump 133 and, as the corresponding valve 126 is closed, the cooling fluid flows by way of the overflow pipe 117 onto the vessel 102.

As the vessel 103 is in the melting stage, its valve 119 is open to the pipe 125 and its valve 126 is open to the pipe 132 so as to put the heater 122 and the pump 129 in circuit. As the vessels 104, 105, 106 are in the heating stage, the valve 119 of the vessel 104 is open to the pipe 124 and the valves 119 of the vessels 105 and 106 are closed. The valves 126 of the vessels 104 and 105 are closed, as is the previously open valve 126 of the vessel 106, the heating liquid now flowing by way of the overflow of the vessel 106 onto the vessel 107 which has passed to the heating stage.

The valve 119 of the latter therefore passes to the closed position so as to stop the supply of cooling fluid, and its valve 126 is open so as to discharge the heating fluid by way of the pipe 131.

The vessels 108 and 109 remain in the crystallization stage. The valve 119 of the vessel 108 passes from the closed to the open position in the pipe 123 so as to supply cooling fluid, the valve of the vessel 109 remaining closed. The valves 126 of the vessels 108 and 109 both remain closed.

The cooling liquid supplied by the exchanger 120 and the pump 127 is taken from the base of the tower and sent by the pump 133 to the distributor of the vessel 101. The positions of the vessels in the cycle are thereafter changed in the same direction every two hours so that each of them is subjected to the various stages of the purification process.

Note that when the heating is applied to the vessels simultaneously located at the base and at the top of the tower T, the pump 133 sends to the top of the latter the heating fluid supplied by the exchanger 121. Further, when the vessels 101, 102, 103 are in the crystallization stage and the vessels 106, 107, 108, 109 are in the heating stage, the pump 133 has no need to intervene since there is no need to send the heat exchange fluid to the top of the tower T.

It is of course possible to separate the impurities resulting from the heating into concentrated impurities, which are discharged, and unconcentrated impurities which are recycled by the raw product. The valves 111 (FIG. 6) for circulating the product and the valves 119 and 126 (FIG. 7) for circulating the heat exchange fluid are advantageously interconnected by a common actuating device. Their shifting is synchronized and adjusted in such manner that a single automatic control device can simultaneously modify their respective positions.

In certain cases a small concentration of a crystallizable body to be purified is contained in a raw product.

In this case, it is of interest to cause the raw product to circulate continuously in the filling and crystallization vessels which are connected in series so that the pure body crystals are progressively deposited on the walls of the vessels and the residual liquid is thus rid of the major part of the body to be purified.

Such an operation can be carried out by means of the apparatus shown in FIG. 6 provided suitable pipes and valves are added to this apparatus.

At the start of the purification cycle, raw product is fed to the vessels 101, 109, 108 and 107, which are connected in series, instead of feeding them periodically and in parallel. The remaining operations are carried out in the same manner as before, the connection to the raw product source 110 being shifted from the vessels 101, 109, 108, 107 to the vessels 109, 108, 107, 106, and so on.

Such an arrangement can be employed in particular for purifying a low concentration of paraxylene in a mixture of xylenes, the final product in this case reaching a purity of 99% or more.

In the embodiments just described, the fractions of a cycle are of 2 hours duration, but it will be understood that they can be of any value, depending on the products treated and the desired purity.

The output of the installation depends on the duration of the cycles.

The final cooling temperature is set by a temperature regulator (not shown) which controls the cold source 120.

A regulator (not shown) for regulating the output of the pump 124 controls the rate of crystallization. A regulator (not shown) for regulating the amount of heat transmitted to the heater 121 determines the amount of impurities it is possible to separate during the purification, and a flow regulator for the pump 128 determines the speed of the purification in the corresponding vessels.

A regulator of the temperature of the melting fluid controls the heater 122. The discharge pump 123 is controlled by the level of the fluid flowing from the lower vessel.

Thus, once the general conditions of the cycle have been set, the apparatus operates in a continuous and automatic manner.

The process and apparatuses just described possess the following advantages over known processes and apparatuses.

If the heat exchange fluid is a liquid, the transfer elements which enclose the product to be purified are completely isolated by a film or layer of liquid, whose temperature is perfectly homogeneous so that the temperature variations that the product is caused to undergo are unaffected by the surrounding temperature conditions.

The product to be purified is in contact solely with the transfer elements. Thus if said product is corrosive, only the transfer elements must be adapted to resist the corrosive action of this product.

If the heat exchange fluid is a liquid, the amount of liquid in circulation is very small. The film or layer of liquid on the transfer elements has a thickness of the order of a fraction of a millimetre.

The consumptions of cold and heat are therefore very small.

If the heat exchange fluid is a gas, these consumptions become insignificant.

Further, in the apparatus shown in FIGS. 6 and 7 in which the circulation of the product is continuous, the reservoirs storing raw, intermediate and finished products are small and the mass of immobilized products is therefore small.

The transfer fluid operates on a plurality of vessels instead of a single one. Therefore, with other factors being the same, its flow equals the flow in discontinuous operation divided by the number of vessels. The dimensions of the pumps, the pipes and exchangers are therefore greatly reduced.

The consumption of cooling and heating agents is constant throughout the operation whereas in discontinuous operation large amounts of heating and cooling agents are required in a short period of time.

The apparatus is regulated merely by the control of the cooling agent source and the heating agent source, the cycle depending on the nature of the product to be purified.

Although the installation operates continuously, benefit is had from a discontinuous progressive purification which alone results in a pure product.

Although specific embodiments of the invention have been described, many modifications and changes may be made therein without departing from the scope of the invention as defined in the appended claims.

Thus, in particular, it is possible to modify the number of vessels according to the nature of the product to be purified, or to provide a plurality of purification towers, the product being subjected to a plurality of successive purification cycles.

Having now described my invention, what I claim as new and desire to secure by Letters Patent is:

1. An apparatus for purifying crystallizable organic compounds containing impurities, said apparatus comprising a pipe connected with a source of liquid compound to be purified, at least four treating vessels for said organic compound to be purified, each of said vessels being in the form of a vertical column having an outer wall, said vessels being closed at the top and bottom by flanges, said vessels each having a plurality of tubes extending continuously through said vessels and through said flanges, inlet means for supplying said compound in liquid state from said pipe into said tubes in said treating vessels at the bottom of said vessels, means at the top of said vessels for distributing a heat exchange fluid, said distributing means including means for spraying said fluid along said outer wall of said treating vessels by gravity and including means for conducting said fluid through the interior of said vessels, said treating vessels being enclosed within a case, said pipe communicating between the exterior and interior of said case, vent conduit means communicating with said tubes in said treating vessels at the top of said vessels, and means for sequentially supplying to said heat exchange fluid distributing means, cooling heat exchange fluid in order to solidify said compound to be purified and heating heat exchange fluid in order to melt said impurities contained in said compound, whereby said compound flows into said treating vessels through said pipe and after being frozen, impurities contained in the first liquid phases produced during melting pass from said heating vessels through said pipe and purified liquid produced by melting subsequent phases also passes from said vessels through said pipe.

2. An apparatus as claimed in claim 1, wherein said vessels are connected to said raw compound source in parallel relation.

3. An apparatus as claimed in claim 1 wherein said treating vessels for the product to be purified each has inner longitudinal plates with said tubes extending longitudinally between said plates, said vessels being mounted in the circuit for circulating the product to be purified.

4. An apparatus as claimed in claim 1, wherein said means for distributing said heat exchange fluid along said outer wall of said vessel and said means for sequentially supplying said cooling and heating fluid comprises a supply pipe communicating by way of manifolds with distributors located above said vessel, a pan located below said vessel and adapted to receive the running fluid and provided with an aperture communicating with a recycling pump and exchanger means.

5. An apparatus as claimed in claim 1, wherein said heat exchange fluid is a gas, said apparatus comprising an outer case with an inlet aperture and an outlet aperture for said gas provided in said case which is rendered fluid-tight and connected to a fan and exchangers, said case being further connected to a reservoir of gas under constant pressure.

6. An apparatus as claimed in claim 1, comprising a tower having superimposed compartments, each of said vessels being located in one of said compartments, said compartments intercommunicating by way of overflow apertures.

7. An apparatus as claimed in claim 1, wherein said means for supplying and discharging said compound and impurities and said means for circulating said heat exchange fluid comprise pipes and multi-way valves.

8. An apparatus as claimed in claim 1, wherein one overflow pipe connects each vessel to said raw compound source.

9. An apparatus as claimed in claim 6, comprising an additional circuit including a pump for taking the heat exchange fluid from the base of the tower and returning in to the top of the latter.

References Cited

UNITED STATES PATENTS

| | | | |
|---|---|---|---|
| 1,909,227 | 5/1933 | Shadle | 62—95 |
| 2,140,744 | 12/1938 | Hirsch | 62—64 |
| 2,140,895 | 12/1938 | Bruce | 62—64 |
| 2,252,173 | 8/1941 | Gibson | 62—62 |
| 2,734,355 | 2/1956 | Wenzelberger | 62—58 |
| 2,787,889 | 4/1957 | Swank | 62—64 |
| 3,285,021 | 11/1966 | Svanoe | 62—58 |
| 2,221,212 | 11/1940 | Wussow et al. | 62—352 |
| 2,397,347 | 3/1946 | Grunen | 62—349 |
| 2,519,844 | 8/1950 | Mojohnier | 62—349 |
| 2,533,616 | 12/1950 | Pace et al. | 62—349 |
| 2,643,524 | 6/1953 | Wilbushewich | 62—352 |
| 3,146,610 | 9/1964 | Lowe | 62—352 |

NORMAN YUDKOFF, Primary Examiner

C. P. RIBANDO, Assistant Examiner

U.S. Cl. X.R.

23—308; 62—58, 123, 349; 165—61, 115, 159, 183